United States Patent [19]

Wheeler

[11] 4,265,458

[45] May 5, 1981

[54] SEAL FOR ELEVATOR DRIVE MECHANISM

[75] Inventor: John H. Wheeler, Dallas, Tex.

[73] Assignee: The Texacone Company, Dallas, Tex.

[21] Appl. No.: 73,024

[22] Filed: Sep. 6, 1979

[51] Int. Cl.³ .............................................. F16J 15/32
[52] U.S. Cl. ................................................... 277/205
[58] Field of Search ............... 277/152, 205, 183, 184, 277/216

[56] References Cited

U.S. PATENT DOCUMENTS

| | | | |
|---|---|---|---|
| 2,467,061 | 4/1949 | Mason | 277/205 |
| 2,561,884 | 7/1951 | Perrow | 277/205 |
| 2,635,907 | 4/1953 | Heimbuch | 277/205 |
| 2,891,827 | 6/1959 | Butkus | 277/205 |

Primary Examiner—Robert I. Smith
Attorney, Agent, or Firm—Richards, Harris & Medlock

[57] ABSTRACT

A seal for use in the gear housing (52) of an elevator hoist drive mechanism (10) is provided. The first embodiment, seal (98), is generally formed of an annular body of elastomeric material having an outer sealing section (102) with first sealing surface (104) for engagement with the inner rim (86 and 88) of gear housing (52), an inner sealing section (106) with second sealing surface (108) for engagement with cylindrical connecting drive shaft (69) and a bonding wall (100) for securing seal (98) on gear housing (52). Sections (102 and 106) are separated by a V-shape groove (124) to insure independent resilence of the sections. Seal (98) is split to form ends (112 and 114) to simplify installation.

The second embodiment, seal (132), is generally formed of an annular body of elastomeric material having a fabric coating. Seal (132) has a compression surface (140) deformably securing the seal to gear housing (52), and a shaft sealing surface (142) with shaft sealing lip (144) for sealing engagement with cylindrical connecting drive shaft (69). A U-shape notch is provided between internal wall (148) and shaft sealing surface end wall (146) for enhanced flexure of shaft sealing lip (144). Seal (132) is split to form two ends to simplify installation of the seal.

4 Claims, 8 Drawing Figures

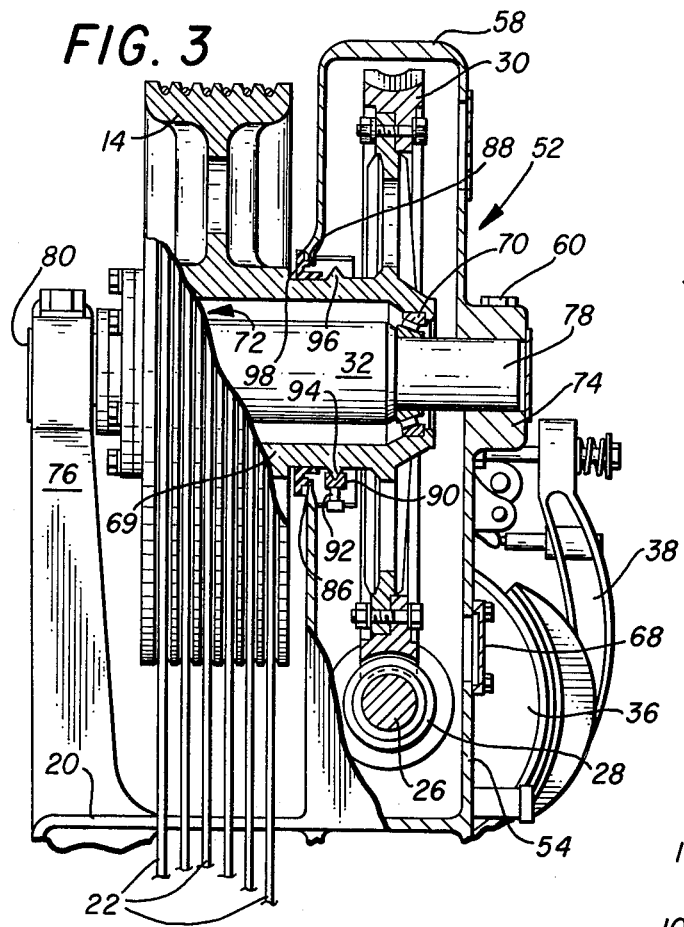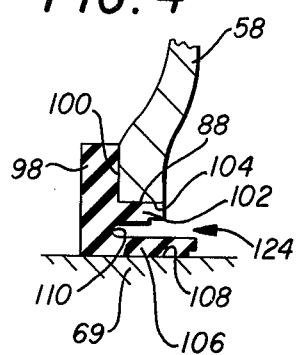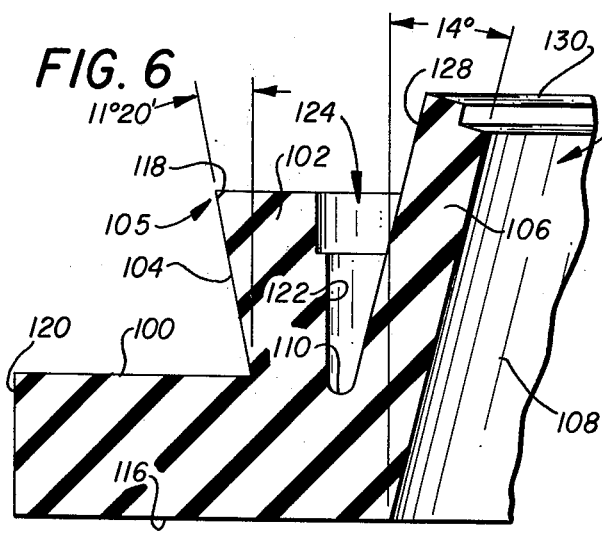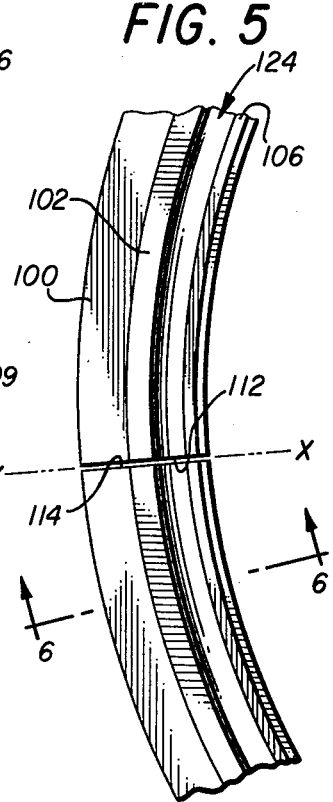

SEAL FOR ELEVATOR DRIVE MECHANISM

TECHNICAL FIELD

This invention relates to sealing means for an elevator drive mechanism, and more particularly to a seal for preventing loss of lubricant in the gear housing of a elevator drive mechanism.

BACKGROUND ART

A very common method of driving elevators for office buildings, apartments and the like has been the use of a reversible DC motor powering a grooved pulley through a reduction gear train. The cables of the elevator mechanism run in tracks provided for them in the grooved pulley and are attached to the elevator car and to the counterweight at opposite ends. This type of elevator drive mechanism is particularly effective in taller buildings where hydraulic cylinder type elevators are impractical. It has the further advantage of requiring only sufficient input of energy to accelerate the elevator and counterweight mass to the desired velocity rather than bodily lifting the entire weight of the elevator as is done in a cable and windup drum mechanism.

In the common elevator drive mechanism of this type, a DC motor is connected by a drive shaft to a worm gear. The worm gear in turn drives a worm wheel which is rigidly fixed to the grooved pulley by means of a hollow cylindrical drive shaft. The entire unit is mounted for rotation about a stationary shaft with an axis coinciding with the axis of rotation of both the worm wheel and grooved pulley. The worm gear and worm wheel are commonly enclosed in a gear housing so that the gears may be adequately lubricated by a suitable lubricant. Typically this gear housing has a circular opening to permit the grooved pulley drive shaft to pass through the gear housing and connect to the grooved pulley. Because of the necessity to adjust the worm wheel to the relatively rigidly fixed worm gear, some gap, approximately $\frac{1}{4}$ to $\frac{3}{8}$ inch, must be provided between the outer surface of the drive shaft driving the grooved pulley and the opening provided for its passage in the gear housing.

A portion of the drive shaft interconnecting the worm wheel and grooved pulley located inside the gear housing typically had a raised rim built up around its outer circumference in a V shape. This rim cooperated with a spring loaded wiper block mounted within the gear housing to remove lubricant from the drive shaft before it progressed out of the gear housing and was lost permanently. This device proved adequate for the relatively low speed at which the elevator drive mechanism was run in the past, however, the higher speeds which have been employed in the more recent models have made this sealing means inadequate. At the speeds now used, the lubricant in the gear housing can actually be vaporized.

A need has thus arisen for a sealing means which could be placed along the drive shaft between the worm wheel and grooved pulley that would function adequately despite the necessity to alter the gap between the gear housing and drive shaft for proper adjustment of the worm wheel and yet be readily applied within the relatively cramped environment of the mechanism.

DISCLOSURE OF THE INVENTION

In accordance with the present invention, a seal is provided for an elevator drive mechanism which is formed of an annular body of elastomeric material. The seal comprises a surface for adhesively bonding the seal to the outside surface of the gear housing around the hole provided for passage of the grooved pulley drive shaft, a first sealing surface for sealing engagement with the inner rim of the hole provided in the gear housing for passage of the drive shaft, and a second sealing surface provided for sealing engagement with the drive shaft.

In accordance with another aspect of the present invention, the seal is split along one radius extending from the central axis of the seal. The seal thus forms a continuous length whereby one end of the seal may be inserted in the gap between the gear housing and drive shaft and the entire seal fed into the proper position from this point. This not only provides for ease of placement in the tight quarters surrounding the elevator drive mechanism but also allows the seal to be inserted without the necessity of removing any portions of the gear housing.

In accordance with the present invention, a second embodiment of a seal for an elevator drive mechanism is provided which is formed of an annular body of elastomeric material with fiber reinforcing. The seal comprises a surface for engagement with the inner rim of a raised portion of the gear housing encircling the hole provided for passage of the grooved pulley drive shaft to provide a compression fit between the seal and gear housing, and a shaft sealing surface for sealing engagement with the drive shaft. The seal is split along one radius extending from the central axis of the seal, thereby forming a continuous length to permit installation without removing any portions of the gear housing. The butt ends formed by the split in the seal are adhesively bonded together during installation.

BRIEF DESCRIPTION OF DRAWINGS

A more complete understanding of the invention and its advantages will be apparent from the following detailed description taken in conjunction with the accompanying drawings in which:

FIG. 3 is a cross sectional view of the elevator drive mechanism taken through line 3—3 as shown in FIG. 2 in the direction of the arrows;

FIG. 4 is an enlargement of a portion of the mechanism shown in FIG. 3;

FIG. 5 is an arcuate portion of the seal viewed from the internal side showing the detail of the sealing surfaces and bonding surface as well as the split in the seal to permit ease of placement in the elevator drive mechanism; and FIG. 6 is a cross section of the seal shown in FIG. 5 along line 6—6.

DETAIL DESCRIPTION

Figure 1:
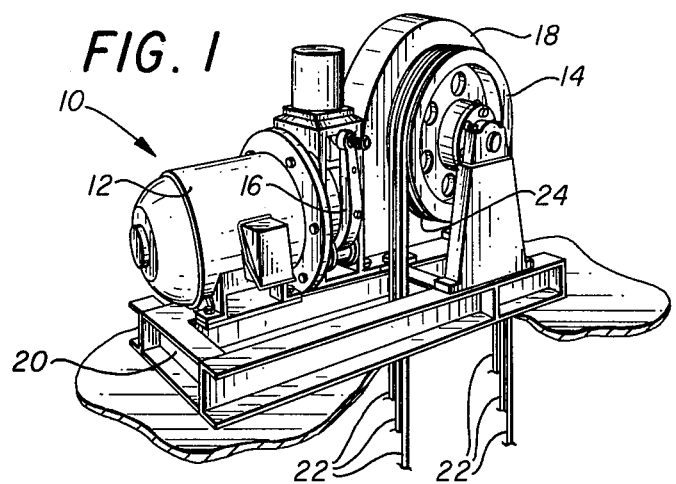
FIG. 1 is a perspective view of a typical elevator drive mechanism employing a reversible motor to drive a grooved pulley.

FIG. 1 illustrates a typical elevator drive mechanism of the type to which the disclosed invention is to be applied and is generally identified by the numeral 10. The mechanism 10 is generally located in the penthouse or elevator mechanism shed on the roof of a building to provide the motive force for the elevators. It consists basically of a motor 12 driving a elevator cable grooved pulley 14 through a brake mechanism 16 and a gear reduction mechanism 18. All these elements are mounted on a mounting frame 20. A plurality of elevator cables 22 are shown riding in grooves 24 in elevator cable sheave pulley 14. One end of each cable 22 is connected to the elevator car, not shown, and the other end is connected to a counterweight, also not shown, so that the only energy input needed to drive the elevator car from floor to floor in operation is that needed to accelerate the mass of the entire system to the desired interfloor velocity and overcome the frictional losses within the system. Elevator cables 22 are retained in the grooves 24 in the elevator cable grooved pulley 14 by the weight of the elevator car and counterweights. The frictional forces developed between the elevator cables 22 and the inner surfaces of grooves 24 because of the weight of the elevator car and counteweights are sufficient to insure that rotation of pulley 14 induces a corresponding motion in the elevator car and counterweight.

Figure 2:
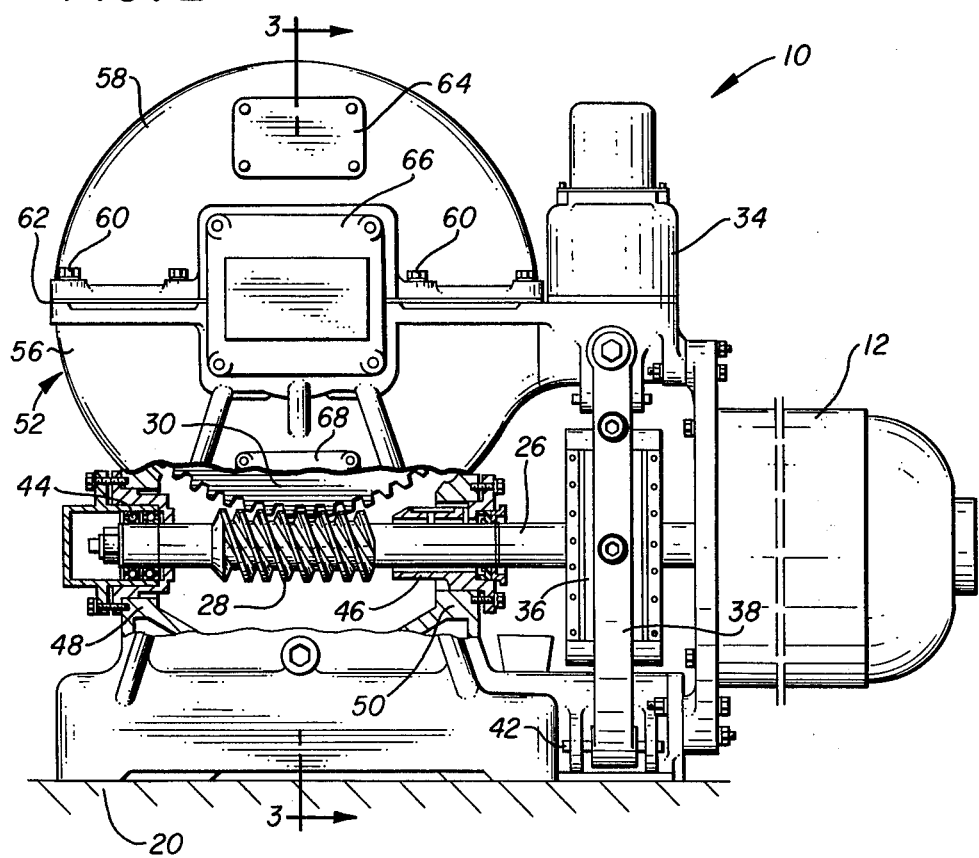
FIG. 2 is a side view of the elevator drive mechanism with a portion of the mechanism cut away to reveal the interior detail.

Referring now generally to FIGS. 2 and 3, means are shown for imparting rotational motion from the motor 12 to the elevator cable grooved pulley 14. In FIG. 2, motor 12 drives a motor drive shaft 26, a worm gear 28 and a worm wheel 30. In FIG. 3, worm wheel 30 drives hollow cylindrical connecting drive shaft 69 and grooved pulley 14 for rotation about stationary shaft 32.

The motor 12 can be of any suitable type, however, it is typically a reversible D.C. type designed to run at a speed that is optimal for the particular building application to which it is to be employed. The motor is controlled by a solenoid 34, which is in turn controlled by a central control panel located elsewhere in the building.

Disposed along the motor drive shaft 26 and rigidly attached thereto is a brake drum 36. Brake drum 36 interacts with brake shoe 38 which has a frictional brake shoe surface of arcuate shape with generally the same radius of curvature as the outer surface of brake drum 36. Forcing brake shoe 38 against the outer surface of brake drum 36 causes the motor drive shaft 26 to slow down or stop rotating. A similar brake shoe 40 is provided on the opposite side of mounting frame 20 to provide symmetrical braking forces. Both brake shoe 38 and 40 are hingeably mounted to mounting frame 20 by pins 42 at their lower end, and are commonly engaged at their upper end by a mechanism serving to tighten the brake shoes against the brake drum 36 when desired.

Rigidly attached to motor drive shaft 26 is worm gear 28. The worm gear 28 and motor drive shaft 26 are supported for rotation on bearing assemblies 44 and 46, which in turn are supported on bearing support mounts 48 and 50 of mounting frame 20.

The worm gear 28 and worm wheel 30 are generally enclosed within a gear housing 52. This housing consists of a lower portion 54 generally shaped to surround the worm gear 28, a middle portion 56 which can be cast integrally with lower portion 54 and is shaped to fit the lower half of worm wheel 30, and an upper portion 58 designed to enclose the upper portion of worm wheel 30. Upper portion 58 is releasably secured to middle portion 56 by bolts 60 and sealed thereon by gasket 62. Various inspection plates 64, 66 and 68 are provided on the gear housing 52 to permit inspection of the gear train when desired. The lower portion 54 of the gear housing 52 is generally supplied with an adequate amount of a suitable lubricant to reduce frictional losses in the various moving elements of the gear reduction mechanism 18 and to minimize the wear on these elements.

As shown generally in FIG. 3 the worm wheel 30 is cast integrally with elevator cable grooved pulley 14 and connected thereto by a hollow cylindrical connecting drive shaft 69. The casting, consisting of the worm wheel, drive shaft and grooved pulley, is mounted for rotation about a stationary shaft 32 on bearing assemblies 70 and 72. Ends 78 and 80 of stationary shaft 32 rest on bearing pedestals 74 and 76, which are an integral part of mounting frame 20.

As can be seen in FIG. 3, semicircular segments must be cut out of the side wall of both the middle portion 56 and upper portion 58 of the gear housing 52 to permit passage of the cylindrical connecting drive shaft 69 and stationary shaft 32 through the gear housing. A gap, typically of $\frac{1}{4}$ to $\frac{3}{8}$ inch, must be provided between the inner rims 86 and 88 formed in the middle portion 56 and upper portion 58 respectively of the gear housing 52, and the outside circumference of the cylindrical connecting drive shaft 69. This gap is necessary to facilitate proper adjustment of worm wheel 30 in its interaction with worm gear 28.

As one means to prevent leakage of the lubricant from the gear housing 52 an oil wiper block 90 is provided and mounted through a spring 92 to the lower portion 54 of the gear housing 52. The oil wiper block 90 is generally in the shape of a rectangular body with a V shaped groove 94 cut into one side. A raised V shaped ring 96 is provided on the outer circumference of cylindrical connecting drive shaft 69 such that the V shaped ring 96 runs within groove 94. Typically, any lubricant migrating outward from the gear housing 52 along the cylindrical connecting drive shaft 69 is forced off ring 96 by the wiper block 90 and returned to the lower portion 54 of the gear housing 52. The combination oil wiper block 90 and V shaped ring 96 was adequate to prevent excessive losses of lubricant when the motor 12 was rotating at relatively low angular velocities such as 700 rpm. In more recent applications the motor has been designed to rotate at substantially higher angular velocities in ranges up to 1800 rpm. At the latter rotational velocity the lubricant within the gear housing 52 is violently agitated and may in fact even be formed into a mist. The wiper block and ring combination have been found to be inadequate to prevent excessive losses at these operating speeds.

The first embodiment of the present invention consists of an annular seal 98 formed of an elastomeric material preferably consisting of a synthetic rubber material such as butyl, viton, nitrile and coated or milled urethane, natural rubber or plastic such as teflon. The seal is placed to effectively seal the gap between the cylindrical connecting drive shaft 69 and the middle and upper portions 56 and 58 of the gear housing 52. Seal 98 is shown installed in FIG. 3. It effectively prevents loss of lubricant from the gear housing 52 for all motor speeds and particularly for higher rotational velocities.

FIG. 4 generally shows the section of the cylindrical connecting drive shaft 69, the upper portion 58 of the gear housing 52, and seal 98 illustrated in FIG. 3 to show greater detail of their interaction. There is provided a bonding surface 100 on the seal so that the seal 98 may be permanently attached to both the middle and upper portions 56 and 58 of gear housing 52. The bonding material may be an epoxy or any other suitable type of adhesive. Seal 98 is also provided with an outer sealing section 102 with a first sealing surface 104 which abuts against inner rim 88 of the upper portion 58 and inner rim 86 of middle portion 56 of gear housing 52 to prevent passage of lubricant from the gear housing 52 to the outside environment. Seal 98 is also provided with an inner sealing section 106 of relatively longer length than outer sealing section 102 and having second sealing surface 108 in close contact with the outer surface of cylindrical connecting drive shaft 69 to prevent lubricant within gear housing 52 from escaping to the outside environment. Outer sealing section 102 and inner sealing section 106 are separated by a V-shaped groove 124 which permits relatively independent flexure of sections 102 and 106. This permits seal 98 to remain effective despite the variation in the gap between inner rims 86 and 88 and the outer circumference of cylindrical connecting drive shaft 69 required by adjustment of worm wheel 30 to worm gear 28. The variation in this gap will commonly be in the range of ⅛ inch. The vertex of V-shape groove 124 lies at the furthest axially external point of groove 124 when seal 98 is installed in the elevator hoist drive mechanism 10 and is formed by groove bottom wall 110. Groove bottom wall 110 is an arcuate surface of substantially constant radius in order to minimize the stress concentrations that would otherwise be created in that area.

FIG. 5 shows a small arcuate segment of the internal side of annular seal 98. Outer sealing section 102 and inner sealing section 106 are shown at the radially outer and inner portions of the seal 98 respectively. The V-shape groove 124 is shown between section 102 and 106. Bonding wall 100 forms the outer rim of the seal 98 as shown in FIG. 5. A single cut is made in the seal 98 coplanar with a plane containing the axis of the seal noted as X/X. This creates two ends 112 and 114 formed of the exposed cross sectional surfaces of the seal 98. This cut greatly simplifies the steps necessary to install seal 98 on the elevator drive mechanism 10. The operator may take either end 112 or 114 and insert it in the gap between the cylindrical connecting drive shaft 69 and inner rim 86 or 88 and feed the gasket around the cylindrical connecting drive shaft until the entire seal 98 is in place. In this manner the seal may be installed by merely providing access to one point around the connecting drive shaft 69 and avoiding the necessity to remove upper portion 58 of the gear housing 52. After the gasket is put in place, the installer may place epoxy or other similar adhesive between the bonding surface 100 of seal 98 and the surfaces of the middle portion 56 and upper portion 58 of gear housing 52 on which bonding surface 100 contacts. This may be done at discrete increments about the bonding surface 100 to hold the seal 98 in place.

FIG. 6 generally shows the cross section of seal 98. Bonding wall 100, external wall 116, and first seal surface end wall 118 all lie in planes substantially parallel with the exterior of gear housing 52 in the immediate vicinity of the seal. Outer wall 120 and outer groove wall 122 are substantially parallel with the axis of rotation of the grooved pulley 14 and worm wheel 30. First sealing surface 104 is disposed at a slight angle to this axis to insure sufficient contact pressure against the inner rims 86 and 88 of the gear housing 52. This angle is preferably 11° 20', although this angle may be varied in accordance with particular requirements. A sealing lip 105 is formed on surface 104 by the intersection of surface 104 with first seal surface end wall 118. The second sealing surface 108 is, in turn, disposed at a slightly larger angle to the axis to insure sufficient contact pressure against the outer surface of cylindrical connecting drive shaft 69. This angle is preferably 14°, however, this angle may vary in accordance with particular requirements. Sealing lip 109 is formed on surface 108 by the intersection of surface 108 and second seal surface end wall 130 at substantially a right angle. The second sealing surface 108 is substantially longer than the first sealing surface 104 due to the need to seal against a moving surface. In order to provide relatively independent compression of the first and second sealing surfaces 104 and 108, respectively, the seal is segmented into outer sealing section 102 and inner sealing section 106. This separation creates the V-shape groove 124 in seal 98 formed by outer groove wall 122 and inner groove wall 128. Inner groove wall 128 lies substantially parallel to the second sealing surface 108. The walls 122 and 128 intersect generally to form the arcuate groove bottom wall 110 of generally constant radius and with angular arc of approximately 166°.

A second embodiment of the present invention consists of an annular seal 132 formed of an elastomeric material and having fiber reinforcing, placed to effectively seal the gap between the cylindrical connecting drive shaft 69 and the middle and upper portions 56' and 58' of the gear housing 52. The seal 132 is shown installed in FIG. 7. It effectively prevents loss of lubricants from the gear housing 52 for all motor speeds and particularly for higher rotational velocities and does not require a retaining ring to secure it to the gear housing.

Figure 7:
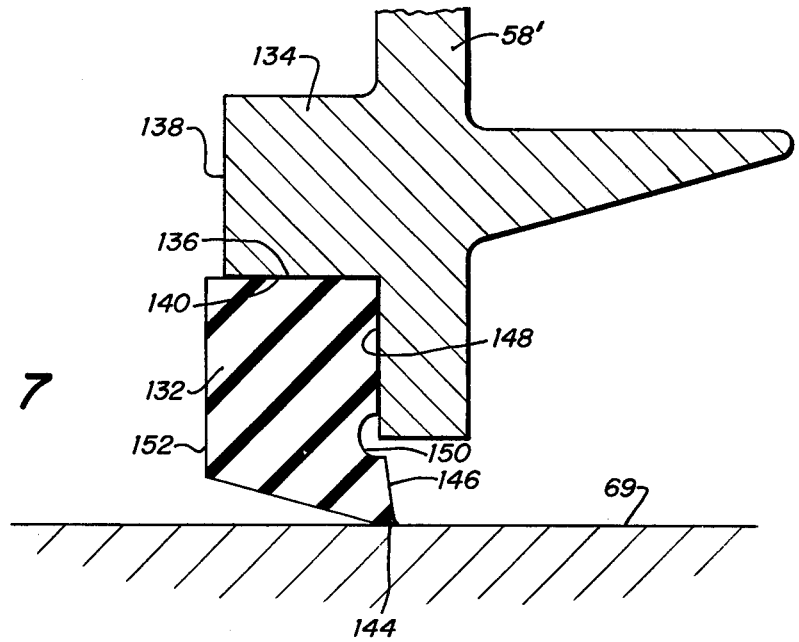
FIG. 7 is an enlargement of a portion of an elevator drive mechanism showing the second embodiment of the present invention.

FIG. 7 generally shows the section of the cylindrical connecting drive shaft 69, the upper portion 58' of the gear housing 52, and seal 132 to show greater detail of their interaction. Upper and middle portions 56' and 58' of the gear housing 52 are provided with raised portion 134, which forms a continuous wall around the hole formed in the gear housing 52 for passage of the cylindrical connecting drive shaft 69. Raised portion 134 of middle and upper portions 56' and 58' is the only material distinction between these portions and portions 56 and 58 described above. Raised portion 134 has an inner rim 136 extending parallel with the axis of rotation of cylindrical connecting drive shaft 69, forming the radially inner surface of raised portion 134. Present attempts to form sealing means for use in gear housing 52 have employed a retaining ring (not shown) which is typically bolted to retaining ring wall 138 of raised portion 134. A seal is placed between the retaining ring and the outer surface of gear housing 52, and lies radially inwardly of the raised portion 134. The retaining ring is necessary to secure this seal in place on gear housing 52. The second embodiment of the present invention eliminates the need for this retaining ring, thereby decreasing the cost of the mechanism and simplying the procedure of installing the seal.

Seal 132 is provided with a compression surface 140 forming the radially outer surface of the seal. The compression surface 140 extends at a slight angle from a line formed parallel with the rotational axis of the cylindrical connecting drive shaft 69 such that the axially internal edge lies radially inwardly from the axially external edge. This slight angle or taper of compression surface 140 aids in placement of the seal between raised portion 134 and the outer surface of the cylindrical connecting drive shaft 69. When seal 132 is installed, compression surface 140 is deformed such that it lies flush against the inner rim 136 of the raised portion 134. The frictional forces created between inner rim 136 and compression surface 140 by this deformation are sufficient to secure seal 132 in the installed position without additional support, such as a retaining ring. In addition, the deformation secures seal 132 in sealing engagement with inner rim 136.

Seal 132 also has a shaft sealing surface 142 forming the radially inner surface of the seal, disposed at a substantial angle to a line formed parallel to the axis of rotation of cylindrical connecting drive shaft 69, for sealing against the outer surface of cylindrical connecting drive shaft 69. Although an integral part of seal 132, the shaft sealing surface 142 is made relatively flexible at its axially internal portion with respect to the remainder of the seal by forming U-shaped notch 150 in the seal. The presence of the U-shaped notch 150 divides the axially internal surface of the annular seal 132 into two portions, an internal wall 148 and a shaft sealing surface end wall 146. Internal wall 148 and shaft sealing surface end wall 146 are not necessarily parallel, but may be disposed at slight angles from each other as shown in FIG. 7. Wall 146 may lie axially internally of the wall 148 to provide enhanced flexibility to the axially internal portion of shaft sealing surface 142. A shaft sealing lip 144 is formed on sealing surface 142 by the intersection of the radially inner and axially internal edge of shaft sealing surface 142 and the radially inner edge of shaft sealing surface end wall 146. Lip 144 is urged into engagement with the outer surface of cylindrical connecting drive shaft 69 for sealing the lubricant within the gear housing 52. The radially inner and axially internal edge of shaft sealing surface 142 is formed with a non-compressed radius smaller than the radius of the outer surface of cylindrical connecting drive shaft 69, causing surface 142 to flex radially outward when installing the seal and thereby urge lip 144 into engagement with shaft 69. The compression of surface 140 during installation further enhances this effect. Seal 132 is also provided with an external wall 152 which may be left exposed as shown in FIG. 7 or may be contacted by a retaining ring as described above to provide redundant means of securing seal 132.

Figure 8:
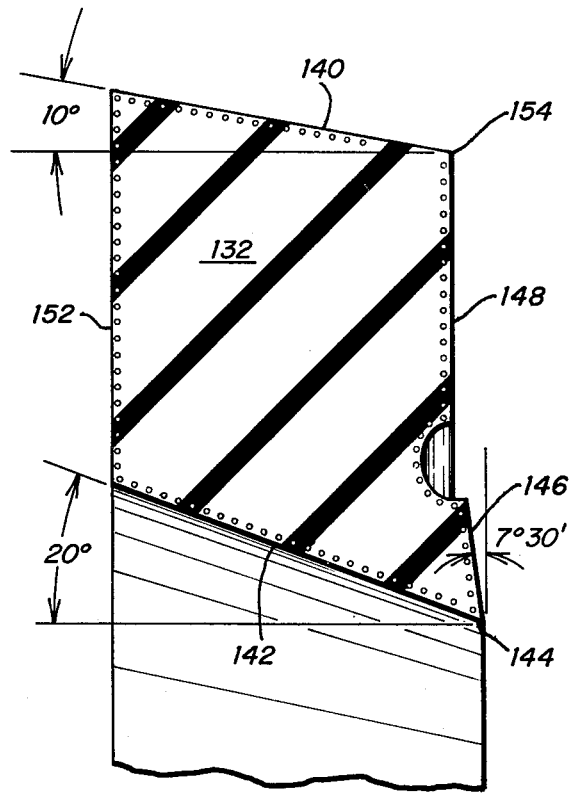
FIG. 8 is a cross section of the second embodiment of the seal illustrated in FIG. 7.

FIG. 8 shows a cross section of seal 132 before installation and in an uncompressed state. The seal is an annular body formed of material from the group consisting of synthetic rubber elastomerics such as butel, viton, nitrile and coated or milled urethane, natural rubber or plastic such as Teflon. In addition the seal can be fabric coated to increase the useful life.

In an uncompressed state, internal wall 148 and external wall 152 are substantially radially disposed. A compression surface 140 extends angularly axially internally and radially inwardly from the outer radial edge of external wall 152 at an angle of substantially 80° from the external wall 152. Shaft sealing surface 142 extends angularly axially internally and radially inwardly from the inner radial edge of the external wall 152 at an angle of substantially 110° from the external wall 152. Shaft sealing surface end wall 146 extends angularly radially outwardly and axially externally from the axially internal and radially inner edge of shaft sealing surface 142 at an angle of substantially 152° 30′ (from the surface 148. The intersection of the shaft sealing surface 142 and shaft sealing surface end wall 146 forming a shaft sealing lip 144 and surface 142. It is clear the angle of the compression surface 140, shaft sealing surface 142 and end wall 146 may be varied in accordance with particular requirements. The radically outward edge of shaft sealing surface end wall 146 and the radially inner edge of internal wall 148 are connected by a U-shaped notch 150 formed in seal 132, permitting shaft sealing lip 144 to flex relatively independently from the main body of seal 132. Fiber reinforcing 154 is disposed about the outer surface of annular seal 132 to form a fabric coating around substantially its full circumference. This coating improves the surface life of the seal.)

Seal 132 is split in a radial direction by a plane containing the axis of the seal in a manner similar to seal 98. This forms a continuous length of seal material with two ends so that the seal may readily be put into its sealing position without disassembling the elevator drive mechanism. The two ends are adhesively bonded together when the seal is installed.

While only two embodiments of the present invention have been described in detail herein and shown in the accompanying drawings, it will be evident that various further modifications are possible without departing from the scope of the invention.

What is claimed is:

1. A seal for use in an elevator hoist drive mechanism comprising:
    an annular body of elastomeric material consisting of a synthetic rubber such as butyl, viton, nitrile and coated or milled urethane, natural rubber or plastic such as Teflon having a substantially radially disposed external wall;
    a substantially axially disposed outer wall extending internally from the outer radial edge of said external wall;
    a substantially radially disposed bonding wall extending inwardly from the axially internal edge of said outer wall to a point lying radially outward from the inner radial edge of said external wall for attaching said seal to the external surface of the gear housing of said elevator hoist drive mechanism;
    a first seal surface extending angularly radially outwardly and axially internally from the inner radial edge of said bonding wall at an angle of substantially 78° 40′ from said bonding wall;
    a substantially radially disposed first seal surface end wall extending radially inwardly from the radially outer and axially internal edge of said first seal surface to a point radially outward from the inner radial edge of said external wall, the intersection of said first seal surface and first seal surface end wall defining a first sealing lip at the radially outer and axially internal edge of said first seal surface;
    a substantially axially disposed outer groove wall extending externally from the radially inner edge of said first seal surface end wall to a point substantially coplanar with said bonding wall;
    a groove bottom wall of substantially uniform radius and an arc length of substantially 166°, with the first edge of said groove bottom wall coinciding with the axially external edge of said outer groove wall and with the radius of curvature of said groove bottom wall lying radially inwardly and axially externally from the outer groove wall;

an inner groove wall extending angularly radially inwardly and axially internally from the second edge of said groove bottom wall at an angle of substantially 14° from the inner surface of a cylindrical surface formed by extending the edge formed by the intersection of said second edge of said groove bottom wall and the radially outward and axially external edge of said inner groove wall in an axially internal direction;

a second seal surface end wall extending angularly radially inwardly and axially externally from the radially inner and axially internal edge of said inner groove wall and formed substantially perpendicular to said inner groove wall; and a second seal surface extending angularly radially outwardly and axially externally from the radially inner and axially external edge of said second seal surface end wall to intersect with the radially inner edge of said external wall, said second seal surface substantially perpendicular to said second seal surface end wall and substantially parallel to said inner groove wall with the intersectiion of said second seal surface and second seal surface end wall defining a second sealing lip at the radially inward and axially internal edge of said second seal surface.

2. The seal for use in an elevator hoist drive mechanism according to claim 1 wherein said first seal surface resiliently engages the inner rim of the opening provided in the gear housing of the elevator hoist drive mechanism for passage of the means to rotate the grooved pulley, and said second seal surface resiliently engages with the outer circumference of said means for rotating said grooved pulley, said first and second seal surfaces preventing loss of lubricant from inside the gear housing.

3. The seal for use in an elevator hoist mechanism according to claim 1 wherein said seal is split in the radial direction by a plane containing the axis of the seal, forming a continuous length of seal material with two ends such that the seal may readily be inserted into its sealing position in the elevator drive mechanism at one point around the periphery of the rim of the gear housing defining passage for the means to rotate the grooved pulley.

4. The seal for use in an elevator hoist drive mechanism according to claim 1 wherein said bonding wall is attached to the external surface of the gear housing about the rim defining passage for the means to rotate the grooved pulley by adhesive materials such as epoxy.

* * * * *